United States Patent [19]

Kitabayashi

[11] Patent Number: 5,281,802
[45] Date of Patent: Jan. 25, 1994

[54] FOCUS ERROR SIGNAL DETECTION DEVICE WITH SEPARATING PRISM

[75] Inventor: Junichi Kitabayashi, Kawasaki, Japan

[73] Assignee: Ricoh Company, Ltd., Tokyo, Japan

[21] Appl. No.: 830,665

[22] Filed: Feb. 4, 1992

[30] Foreign Application Priority Data

Feb. 20, 1991 [JP] Japan .................................. 3-47577
Mar. 15, 1991 [JP] Japan .................................. 3-76978

[51] Int. Cl.⁵ .......................... G01J 1/20; G11B 7/00
[52] U.S. Cl. ............................... 250/201.5; 369/44.42
[58] Field of Search ...................... 250/201.5, 201.1;
369/44.24, 44.23, 44.42, 44.41, 44.12

[56] References Cited

U.S. PATENT DOCUMENTS

| | | | |
|---|---|---|---|
| 4,533,826 | 8/1985 | Van Alem | 250/201.5 |
| 4,612,437 | 9/1986 | Ohsato | 250/201.5 |
| 4,724,533 | 2/1988 | Ohara et al. | 250/201.5 |
| 4,801,794 | 1/1989 | Kowalski et al. | 250/201.5 |
| 4,870,632 | 9/1989 | Shiono et al. | 369/44.23 |
| 5,015,835 | 5/1991 | Ohuchida et al. | |
| 5,101,389 | 3/1992 | Ohuchida et al. | |
| 5,151,887 | 9/1992 | Miyazaki | 250/201.5 |
| 5,161,139 | 11/1992 | Inoue et al. | 250/201.5 |

FOREIGN PATENT DOCUMENTS

| | | | |
|---|---|---|---|
| 0042743 | 3/1986 | Japan | 369/44.23 |
| 0315036 | 12/1989 | Japan | 250/201.5 |
| 0265028 | 10/1990 | Japan | 369/44.23 |

*Primary Examiner*—Michael Messinger
*Attorney, Agent, or Firm*—Cooper & Dunham

[57] ABSTRACT

A focus error signal detection device comprising an optical system for guiding a reflection beam reflected from an optical information recording medium to a photo-detection system side. A beam dividing system is arranged for dividing the reflection beam to two beams. Two photo-detecting units are arranged for detecting the two divided beams, respectively, each unit having light receiving surfaces arranged on a same plane. A beam position adjusting system is arranged for adjusting optical axes of the two divided beams with respect to predetermined positions of the photo-detecting units by simultaneously moving the two detecting units with respect to the beam dividing system.

9 Claims, 9 Drawing Sheets

FOCUS ERROR SIGNAL DETECTION DEVICE WITH SEPARATING PRISM

BACKGROUND OF THE INVENTION

1. Field of the Invention

The present invention relates to a focus error signal detection device for an optical information read/write apparatus such as an optical disk device.

2. Description of the Related Art

As a method for detecting a focus error signal in an optical information read/write device according to the related art in this field, there is known Foucault method which has a high detection sensitivity in comparison to the other focus error signal detection methods and enables to reliably detect the error signal even if the angle of the optical axis of the incident light flux is changed.

There are various kinds of device for detecting the focus error signal in accordance with Foucault method.

A first example of the focus error signal detection device utilizing Foucault method is disclosed in Japanese Patent Application Laying Open (KOKAI) No. 1-144235. This example is arranged in such a way that a condenser lens and a beam splitter are combined together to form one unit which lens is disposed for converging the light reflected from the optical information medium on the light receiving element surface and which splitter is disposed on an optical path of the reflection light and divide the flux of the reflection light to two luminous fluxes or more.

A second example of the focus error signal detection device of the related art is disclosed in Japanese Patent Application Laying Open (KOKAI) No. 1-98131. In accordance with the second example, the focus error signal is detected by Foucault method with the use of a diffraction grating having two areas in such a way that considering the change of diffraction angle due to the fluctuation of wavelength and the deformation of the optical spot on the light receiving element caused by the diffraction angle change, the divisional line of the light receiving element is inclined with respect to the direction of diffraction so that the outputs of adjacent light receiving elements are always the same.

A third example of the focus error signal detection device of the related art is disclosed in Japanese Patent Application Laying Open (KOKAI) No. 2-49227. In accordance with the third example, the detection device is arranged in such a way that the reflection light reflected from the optical information recording medium passes through a roof type prism and a triangle prism and after that the reflection light is detected by a pair of light receiving elements, each having a detection area which is divided to two parts wherein the focus error signal is detected in a state where the two elements are disposed in a same plane.

However, with respect to the first example of the related art, it is troublesome to adjust the optical axis of the device at the time of detecting the focus error signal with the use of Foucault method.

Also, with respect to the second embodiment of the related art, the divisional line for dividing the light receiving surface of the light receiving element is inclined by 20 to 30 minutes in order to cancel the influence from the wavelength fluctuation of the diffraction grading element whereas it is necessary to incline the light receiving element by 5 to 10 degrees to adjust the position thereof, which makes it difficult to obtain a reliable adjustment of the device for detecting the focus error signal with the use of Foucault method.

Further, with respect to the third example of the related art, a pair of two-divided light receiving elements are disposed in a same plane by using prisms to obtain a compact structure of the device, which however, either disables to fully adjust the focus error signal or enables to adjust the focus error signal with the use of optical elements of very high accuracy as a result of which the cost of the device becomes high.

As mentioned above, the focus detection method with the use of Foucault method is advantageous in that the detection sensitivity is high and the focus can be detected even the optical axis is dislocated whereas it also has a disadvantage that the focus spot diameter is small so that it becomes hard and troublesome to adjust the position of the photo-detector. Such a troublesome adjustment operation has to be done for each of two focus spots, which necessitates two photo-detectors as a result of which it becomes difficult to obtain a small and compact structure of the device.

To obviate such a problem, a focus control device has been proposed in Japanese Patent Application Laying Open (KOKAI) No. 2-14434, for instance. The focus control device disclosed in the patent document comprises two pairs of parallel plates are combined in an X-shape so that two Foucault spots of semi-circle are generated. However, the proposed device disclosed in the patent document, for example, has disadvantages that it is not easy to arrange the parallel plates that it is hard to obtain a compact structure of the device that it becomes necessary to adjust the rotational position of the photodetectors and that the focus is not reliably detected when the optical axis is dislocated since the optical path lengths of the two paths becomes different from each other when the optical axis is inclined.

Also, Japanese Patent Application Laying Open (KOKAI) No. 2-49227 discloses an optical head which comprises a detection system arranged from a photodetector and a prism combined together and disposed on a same plane.

However, the optical head structure disclosed in the patent document has also disadvantages that it is hard to produce a fully satisfactory prism structure and that it is not possible to adjust the position of the photodetector by Foucault method.

SUMMARY OF THE INVENTION

The present invention was made considering the above mentioned problems of the related art.

It is therefore an object of the present invention to provide a focus detection device which utilizes Foucault method and makes it possible to easily adjust the position of the optical axis and the photodetector surface with a simple and compact structure.

The above mentioned object of the present invention can be achieved by a focus error signal detection device comprising:

an optical system for guiding a reflection beam reflected from an optical information recording medium to a photo-detection system side;

a beam dividing system for dividing the reflection beam to two beams;

two photo-detecting units for detecting the two divided beams, respectively, having light receiving surfaces arranged on a same plane; and a beam position adjusting system for adjusting optical axes of the two divided beams with respect to predetermined positions of the photo-detecting units by simultaneously moving the two detecting units with respect to the beam dividing system.

In accordance with a first embodiment of the present invention, there is proposed an optical information read/write device which records information data in an optical information recording medium by converging a luminous flux emitted from a semiconductor laser device by a condenser lens on a surface of the information recording medium as well as which read/write device also reads the information data from the recording medium by introducing the reflection light reflected from the recording medium surface into a beam splitter so that the reflection beam is separated from the laser beam emitted from the semiconductor laser device so that the information data is read and the focus error signal is detected from the reflection beam, wherein a beam divisional prism having a roof type beam separation surface is arranged so that a reflection light reflected from the optical information recording medium is divided to two semi-circle luminous fluxes arranged on an optical path of the reflection light after passing through the beam splitter and wherein two (a pair of) two-divided light receiving elements (photodetector elements) are arranged combined together to form one unit arranging the light receiving surfaces of the two elements on a same plane each of which surfaces receives the semicircle luminous flux divided by the beam divisional prism and detects the focus error signal from the position change of the convergent point of the luminous flux and wherein the divisional line of the light receiving surface of each light receiving element is inclined with respect to the direction perpendicular to the direction along which the beams are separated by the prism so that the two light receiving elements are disposed in such a way that the two divisional lines become substantially or approximately symmetric with each other with respect to a line perpendicular to the direction along which the beams are separated by the prism.

In accordance with a second embodiment of the present invention, there is proposed an optical information read/write device which records information data in an optical information recording medium by converging a luminous flux emitted from a semiconductor laser device by a condenser lens on a surface of the information recording medium as well as which read/write device also reads the information data from the recording medium by introducing the reflection light reflected from the recording medium surface into a beam splitter so that the reflection beam is separated from the laser beam emitted from the semiconductor laser device so that the information data is read and the focus error signal is detected from the reflection beam, wherein a beam divisional prism having a roof type beam separation surface is arranged so that a reflection light reflected from the optical information recording medium is divided to two semi-circle luminous fluxes arranged on an optical path of the reflection light after passing through the beam splitter and wherein two (a pair of) two-divided light receiving elements (photodetector elements) are arranged combined together to form one unit arranging the light receiving surfaces of the two elements on a same plane each of which surfaces receives the semicircle luminous flux divided by the beam divisional prism and detects the focus error signal from the position change of the convergent point of the luminous flux and wherein the beam separation surface of the beam divisional prism is inclined with respect to the light receiving surface of the two-divided light receiving element in the direction perpendicular to the direction along which the beams are separated by the prism.

In accordance with a third embodiment of the present invention, there is proposed an optical information read/write device which records information data in an optical information recording medium by converging a luminous flux emitted from a semiconductor laser device by a condenser lens on a surface of the information recording medium as well as which read/write device also reads the information data from the recording medium by introducing the reflection light reflected from the recording medium surface into a beam splitter so that the reflection beam is separated from the laser beam emitted from the semiconductor laser device so that the information data is read and the focus error signal is detected from the reflection beam, wherein a beam divisional first rectangular prism having a beam separation reflecting surface is arranged so that a reflection light reflected from the optical information recording medium is reflected and divided to two semi-circle luminous fluxes arranged on an optical path of the reflection light after passing through the beam splitter, wherein a second prism and a third prism are arranged, each prism having an inclined surface for reflecting the semicircle luminous flux reflected and separated by the beam separation reflecting surface of the first rectangular prism, wherein two (a pair of) two-divided light receiving elements (photodetector elements) are arranged combined together to form one unit arranging the light receiving surfaces of the two elements on a same plane each of which surfaces receives the semicircle luminous flux reflected by the inclined surfaces of the second and third prisms and detects the focus error signal from the position change of the convergent point of the luminous flux and wherein the divisional line of the light receiving surface of each light receiving element is inclined with respect to the direction perpendicular to the direction along which the beams are separated by the prism so that the two light receiving elements are disposed in such a way that the two divisional lines become substantially or approximately symmetric with each other with respect to a line perpendicular to the direction along which the beams are separated by the prism.

In accordance with a fourth embodiment of the present invention, there is proposed an optical information read/write device which records information data in an optical information recording medium by converging a luminous flux emitted from a semiconductor laser device by a condenser lens on a surface of the information recording medium as well as which read/write device also reads the information data from the recording medium by introducing the reflection light reflected from the recording medium surface into a beam splitter so that the reflection beam is separated from the laser beam emitted from the semiconductor laser device so that the information data is read and the focus error signal is detected from the reflection beam, wherein a beam divisional first rectangular prism having a beam separation reflecting surface is arranged so that a reflection light reflected from the optical information recording medium is reflected and divided to two semi-circle luminous fluxes arranged on an optical path of the reflection light after passing through the beam splitter, wherein a second prism and a third prism are arranged, each prism having an inclined surface for reflecting the semicircle luminous flux reflected and separated by the beam separation reflecting surface of the first rectangular prism, wherein two (a pair of) two-divided light receiving elements (photodetector elements) are arranged combined together to form one unit arranging the light receiving surfaces of the two elements on a same plane each of which surfaces receives the semicircle luminous flux reflected by the inclined surfaces of the second and third prisms and detects the focus error signal from the position change of the convergent point of the luminous flux and wherein the second and third prisms are disposed in such a way that the two ridgelines of the prisms become substantially or approximately symmetric with each other with respect to a line perpendicular to the direction along which the beams are separated by the first prism.

In accordance with a fifth embodiment of the present invention, there is proposed an optical information read/write device which records information data in an optical information recording medium by converging a luminous flux emitted from a semiconductor laser device by a condenser lens on a surface of the information recording medium as well as which read/write device also reads the information data from the recording medium by introducing the reflection light reflected from the recording medium into a beam splitter so that the reflection beam is separated from the laser beam emitted from the semiconductor laser device so that the information data is read and the focus error signal is detected from the reflection beam, wherein a beam divisional prism having a beam separation reflecting surface is arranged so that a reflection light reflected from the optical information recording medium is divided to two semi-circle luminous fluxes arranged on an optical path of the reflection light after passing through the beam splitter, wherein two oblique side prisms having a reflection surface for reflecting the luminous flux reflected and separated by the beam separation reflecting surface of the beam divisional prism are disposed in such a way that the reflection surfaces are arranged so that the reflection beams reflected by the surfaces become perpendicular to each other and wherein two (a pair of) two-divided light receiving elements (photodetector elements) are arranged combined together to form one unit arranging the light receiving surfaces of the two elements on a same plane each of which surfaces receives the semicircle luminous flux reflected by the reflection surface of the prism and detects the focus error signal from the position change of the convergent point of the luminous flux and wherein the divisional line of the light receiving surface of each light receiving element is arranged to correspond to the inclination angle of the reflection surface of the oblique side prism.

In accordance with a sixth embodiment of the present invention, there is proposed an optical information read/write device which records information data in an optical information recording medium by converging a luminous flux emitted from a semiconductor laser device by a condenser lens on a surface of the information recording medium as well as which read/write device also reads the information data from the recording medium by introducing the reflection light reflected from the recording medium surface into a beam splitter so that the reflection beam is separated from the laser beam emitted from the semiconductor laser device so that the information data is read and the focus error signal is detected from the reflection beam, wherein a beam divisional prism having a beam separation reflecting surface is arranged so that a reflection light reflected from the optical information recording medium is divided to two semi-circle luminous fluxes arranged on an optical path of the reflection light after passing through the beam splitter, wherein three rectangular prisms having a reflection surface for reflecting the luminous flux reflected and separated by the beam separation reflecting surface of the beam divisional prism are disposed in such a way that the reflection surfaces are arranged so that the reflection beams reflected by the surfaces become perpendicular to each other and wherein two (a pair of) two-divided light receiving elements (photodetector elements) are arranged combined together to form one unit arranging the light receiving surfaces of the two elements on a same plane each of which surfaces receives the semicircle luminous flux reflected by the reflection surface of the prism and detects the focus error signal from the position change of the convergent point of the luminous flux and wherein the divisional line of the light receiving surface of each light receiving element is arranged to correspond to the inclination angle of the reflection surface of the rectangular prism and wherein the light receiving surfaces of the two-divided light receiving elements are disposed before and behind the convergent point of the luminous flux, respectively.

It is an advantage of the present invention realized by the first embodiment of the present invention so that it becomes possible to easily adjust the positional relation between the light receiving surface of the photodetector element and the convergent point of the optical flux to be detected even in the structure wherein the two pairs of the two-divided light receiving elements (photodetector elements) are combined together on the same substrate to form one unit, which makes it possible to realize a compact structure of the focus error detection device which enables to easily adjust the optical axis at the time of detecting the focus error with the use of Foucault method, due to the arrangement wherein the divisional line of the light receiving surface of each light receiving element is inclined with respect to the direction perpendicular to the direction along which the beams are separated by the prism so that the two light receiving elements are disposed in such a way that the two divisional lines become substantially or approximately symmetric with each other with respect to a line perpendicular to the direction along which the beams are separated by the prism, that is, the divisional lines are reversely inclined toward opposite directions separating away from the direction of the ridgeline of the beam divisional prism.

The above mentioned advantage of the present invention is also realized by the second embodiment of the present invention so that it becomes possible to easily adjust the positional relation between the light receiving surface of the photodetector element and the convergent point of the optical flux to be detected even in the structure wherein the two pairs of the two divided light receiving elements (photodetector elements) are combined together on the same substrate to form one unit, which makes it possible to realize a compact structure of the focus error detection device which enables to easily adjust the optical axis at the time of detecting the focus error with the use of Foucault method, due to the arrangement wherein the beam separation surface of the beam divisional prism is inclined with respect to the light receiving surface of the two-divided light receiving element in the direction perpendicular to the direction along which the beams are separated by the prism, that is, the direction of the ridgeline of the beam divisional prism.

The above mentioned advantage of the present invention can be also realized by the third embodiment of the present invention so that it becomes possible to easily adjust the positional relation between the light receiving surface of the photodetector element and the convergent point of the optical flux to be detected even in the structure wherein the two pairs of the two-divided light receiving elements (photodetector elements) are combined together on the same substrate to form one unit, which makes it possible to realize a compact structure of the focus error detection device which enables to easily adjust the optical axis at the time of detecting the focus error with the use of Foucault method, due to the arrangement wherein the divisional line of the light receiving surface of each light receiving element is inclined with respect to the direction perpendicular to the direction along which the beams are separated by the prism so that the two light receiving elements are disposed in such a way that the two divisional lines become substantially or approximately symmetric with each other with respect to a line perpendicular to the direction along which the beams are separated by the prism, that is, the divisional lines are reversely inclined toward opposite directions separating away from the direction of the ridgeline of the first rectangular prism.

The above mentioned advantage of the present invention can be also realized by the fourth embodiment of the present invention so that it becomes possible to easily adjust the positional relation between the light receiving surface of the photodetector element and the convergent point of the optical flux to be detected even in the structure wherein the two pairs of the two-divided light receiving elements (photodetector elements) are combined together on the same substrate to form one unit, which makes it possible to realize a compact structure of the focus error detection device which enables to easily adjust the optical axis at the time of detecting the focus error with the use of Foucault method, due to the arrangement wherein the second and third prisms are disposed in such a way that the two ridgelines of the prisms become substantially or approximately symmetric with each other with respect to a line perpendicular to the direction along which the beams are separated by the first prism, that is, the ridgelines are reversely inclined toward opposite directions separating away from the direction of the ridgeline of the first rectangular prism.

The above mentioned advantage of the present invention can be also realized by the fifth embodiment of the present invention so that it becomes possible with respect to the individual photodetector element to independently and easily adjust the positional relation between the light receiving surface of the photodetector element and the convergent point of the optical flux to be detected even in the structure wherein the two pairs of the two-divided light receiving elements (photodetector elements) are combined together on the same substrate to form one unit, which makes it possible to realize a compact structure of the focus error detection device which enables to easily adjust the optical axis at the time of detecting the focus error with the use of Foucault method, due to the arrangement wherein two oblique side prisms having a reflection surface for reflecting the luminous flux reflected and separated by the beam separation reflecting surface of the beam divisional prism are disposed in such a way that the reflection surfaces are arranged so that the reflection beams reflected by the surfaces become perpendicular to each other and wherein two (a pair of) two-divided light receiving elements (photodetector elements) are arranged combined together to form one unit arranging the light receiving surfaces of the two elements on a same plane each of which surfaces receives the semicircle luminous flux reflected by the reflection surface of the prism and detects the focus error signal from the position change of the convergent point of the luminous flux and wherein the divisional line of the light receiving surface of each light receiving element is arranged to correspond to the inclination angle of the reflection surface of the oblique side prism, that is, two beams separated with the use of two oblique prisms are arranged perpendicular to the two divisional lines of the two-divided photodetector elements, respectively.

The above mentioned advantage of the present invention can be also realized by the sixth embodiment of the present invention so that it becomes possible with respect to the individual photodetector element to independently and easily adjust the positional relation between the light receiving surface of the photodetector element and the convergent point of the optical flux to be detected even in the structure wherein the two pairs of the two-divided light receiving elements (photodetector elements) are combined together on the same substrate to form one unit, which makes it possible to realize a compact structure of the focus error detection device which enables to easily adjust the optical axis at the time of detecting the focus error with the use of Foucault method, due to the arrangement wherein a beam divisional prism having a beam separation reflecting surface is arranged so that a reflection light reflected from the optical information recording medium is divided to two semi-circle luminous fluxes arranged on an optical path of the reflection light after passing through the beam splitter, wherein three rectangular prisms having a reflection surface for reflecting the luminous flux reflected and separated by the beam separation reflecting surface of the beam divisional prism are disposed in such a way that the reflection surfaces are arranged so that the reflection beams reflected by the surfaces become perpendicular to each other and wherein two (a pair of) two-divided light receiving elements (photodetector elements) are arranged combined together to form one unit arranging the light receiving surfaces of the two elements on a same plane each of which surfaces receives the semicircle luminous flux reflected by the reflection surface of the prism and detects the focus error signal from the position change of the convergent point of the luminous flux and wherein the divisional line of the light receiving surface of each light receiving element is arranged to correspond to the inclination angle of the reflection surface of the rectangular prism and wherein the light receiving surfaces of the two-divided light receiving elements are disposed before and behind the convergent point of the luminous flux, respectively, that is, two beams separated with the use of three rectangular prisms are arranged perpendicular to the two divisional lines of the two-divided photodetector elements, respectively.

BRIEF DESCRIPTION OF THE DRAWINGS

FIG. 1b is a front view of the beam divisional prism used in the focus error signal device of FIG. 1a;

FIG. 1c is a front view of the two-divided light receiving element used in the focus error detection device of FIG. 1a;

FIG. 4b is a front view of the prism used in the focus error signal detection device of FIG. 4a;

FIG. 4c is a front view of the light receiving element used in the focus error signal detection device of FIG. 4a;

FIG. 5b is a plan view of the light receiving element of FIG. 5a;

FIG. 6b is a side view of the focus error signal detection device of FIG. 6a;

FIG. 6c is a plan view of the light receiving element integrated with a substrate used in the focus error signal detection device of FIG. 6a;

FIG. 8b is a perspective view of the other of the pair of prisms to be combined with the prism of FIG. 8a;

FIG. 9c is a plan view of the light receiving element integrated with a substrate and used in the focus error detection device of FIG. 9a;

FIG. 10b is a perspective view of an arrangement of prisms used in the structure of FIG. 10a;

FIG. 10c is a plan view of an arrangement of the light receiving elements used in the structure of FIG. 10a;

FIG. 11b is a perspective view of an arrangement of prisms used in the structure of FIG. 11a; and FIG. 11c is a plan view of an arrangement of light receiving elements used in the structure of FIG. 11a.

DESCRIPTION OF THE PREFERRED EMBODIMENTS

Figure 1A:
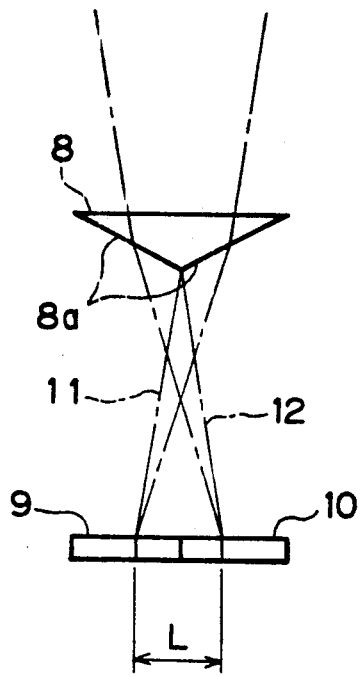
FIG. 1a is a plan view of the focus error signal detection device in accordance with an embodiment of the present invention.
Figure 1B:
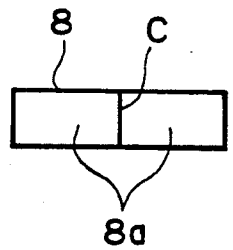
Figure 1C:
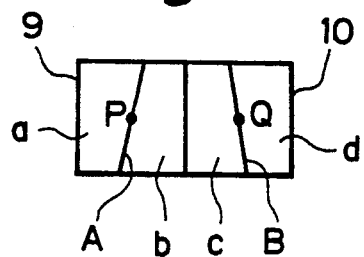

A first embodiment of the present invention is described hereinafter with reference to FIGS. 1 to 3.

Figure 3:
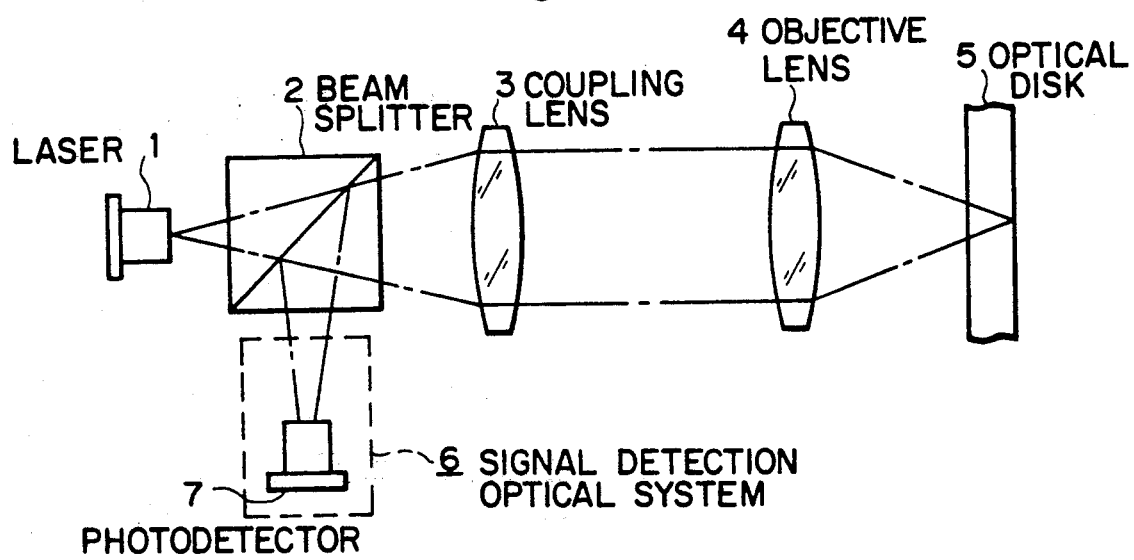
FIG. 3 is a plan view of a whole structure of an optical information read/write device in relation to the present invention.

First, FIG. 3 illustrates a whole structure of the optical information read/write device in which the focus error signal is detected. A laser output beam emitted from a semiconductor laser device 1 passes through a beam splitter 2 and collimated by a coupling lens 3. The collimated parallel beam is then converged by an objective lens 4 on a surface of an optical disk 5 which constitutes an optical information recording medium so that information data can be recorded in the disk.

Also, the convergent beam is reflected by the disk surface. The reflection beam reflected from the disk 5 propagates back through the objective lens 4 and the coupling lens 3 to the beam splitter 2 where the backward reflection beam is reflected and guided to a photodetector 7 in a signal detection optical system 6 which is arranged for reading information data from the reflection beam and detects the focus error signal and the track error signal from the reflection beam. The focus error signal and the track error signal detected by the optical system are applied back to an actuator (not shown) of the objective lens for feed back control for controlling the focus and track of the structure.

Next, the focus error detection device assembled within the above mentioned optical information read/write device is described below.

The reflection beam reflected from the disk 5 is further reflected by the beam splitter 2. On an optical path of the reflection beam reflected by the beam splitter 2, there is arranged a beam divisional prism 8 having beam separation surfaces 8a which form a roof structure for dividing the reflection beam to two semi-circle luminous fluxes. Further, on the optical paths of the divided two semi-circle luminous fluxes, there is arranged a pair of two-divided light receiving elements 9 and 10, respectively, each element constituting a photodetector having a light receiving area (detector area) which is divided to two parts. The photodetector element 9 has two detector areas (a) and (b). Also, the detector element 10 has two detector areas (c) and (d), respectively. The two elements 9 and 10 are disposed in a same plane and arranged to form one integral unit. Also, the elements are arranged in such a way that the divisional line (A) of the element 9 between the light receiving areas (a) and (b) and the divisional line (B) of the element 10 between the light receiving areas (c) and (d) are inclined with respect to a line perpendicular to the direction along which the two semi-circle beams are separated, that is, with respect to the ridgeline (C) of the prism 8 so that the divisional lines are reversely inclined away from the line so that the lines (A) and (B) substantially or approximately become symmetric with each other with respect to a line corresponding to the ridgeline of the prism 8.

In accordance with the above mentioned structure of the present invention, the light incident to the beam divisional prism 8 is divided to two luminous fluxes 11 and 12 each of which has a semi-circle beam section. The separated two beam fluxes 11 and 12 are converged on the divisional lines (A) and (B) formed on the light receiving surfaces of the photodetector elements 9 and 10, respectively. The convergent point has to be positioned on the divisional line of the light receiving area of the detector element for detecting and analyzing the optical beam converged on the light receiving surface. In accordance with the structure of the first embodiment of the present invention, the divisional lines (A) and (B) are formed in such a way that the lines are reversely inclined with respect to the line corresponding to the ridgeline (C) which is perpendicular to the direction along which the two semi circle beams 11 and 12 are separated, in other words, the divisional lines (A) and (B) are arranged, substantially or approximately symmetric with each other with respect to a line parallel to the ridgeline of the prism 8 separating away from the line and from each other in one direction. Therefore, it becomes possible to locate the two convergent points (P) and (Q) on the divisional lines (A) and (B), respectively and simultaneously, by moving the integrated unit composed of two detector elements 9 and 10 along the direction of the line (C) which is perpendicular to the drawing sheet of FIG. 1a so as to find out and adjust the position where the length (L) between the convergent point (P) and (Q) of the beams 11 and 12 becomes equal to the width between the two divisional lines (A) and (B) of the detector elements 9 and 10.

The prism 8 may be secured with respect to the detector elements 9 and 10 to form one integral unit composed of the prism and the detector elements.

Figure 2:
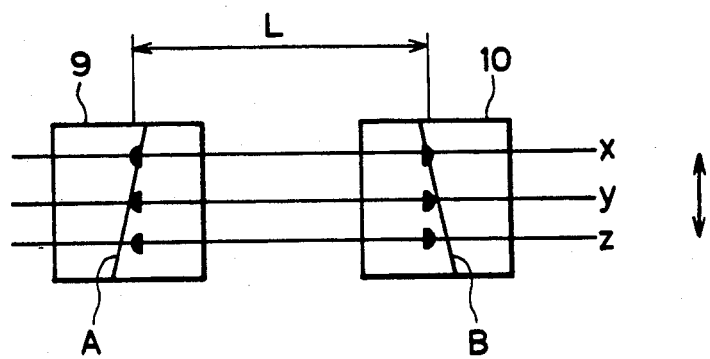
FIG. 2 is an explanatory view for explaining a method for changing and adjusting the gap between the spots with respect to the gap between the divisional lines.

FIG. 2 explains the function for adjusting the convergent points in relation to the divisional lines of the detector elements 9 and 10 which are secured to each other to form one integral body.

In the positions (y) and (z) in FIG. 2, the semi-circle convergent beams (convergent points P and Q) are dislocated from the divisional lines (A) and (B), respectively. Instead, the convergent points are located on the divisional lines in the position (x). Therefore, it becomes possible to adjust the positional relation of the convergent points (P) and (Q) of the luminous fluxes to be detected with respect to the detector surface (a), (b), (c) and (d) of the detector elements 9 and 10, respectively, with the structure wherein a pair of two-divided detector elements 9 and 10 are integrally formed on a same substrate, as a result of which it becomes possible to realize a compact structure of the focus error signal detection device which enables to easily adjust the positional relation of the optical axis of the luminous flux in the optical system.

In the above mentioned adjustment process of the convergent points with respect to the divisional lines of the light receiving elements, the focus error signal can be detected from the following equation by Foucault method.

$$Fo = (a+d) - (b+c)$$

It is to be noted that, if necessary, the track error signal can be detected and the information data can be read as well with the use of the structure of the focus error detection device mentioned above.

Figure 4A:
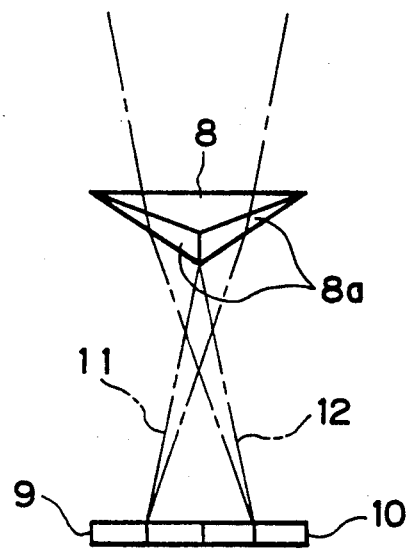
FIG. 4a is a plan view of the focus error signal detection device in accordance with another embodiment of the present invention.
Figure 4B:
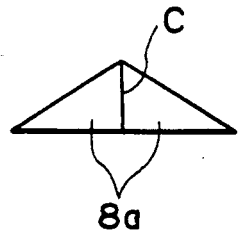
Figure 4C:
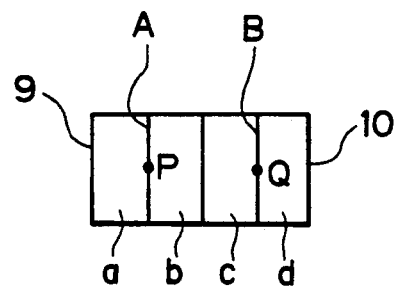

FIGS. 4a to 4c illustrate a second embodiment of the present invention. The same or corresponding parts as the first embodiment are designated by the same numerals or letters and the description thereof are deleted.

In this embodiment, as illustrated in FIG. 4c, the detector elements 9 and 10 have light receiving surfaces (a), (b), (c) and (d), respectively, for detecting luminous fluxes 11 and 12 separated by the separation surfaces 8a of the beam divisional prism 8. The two elements 9 and 10 are arranged on a same plane to form an integral unit structure Also, as illustrated in FIGS. 4a and 4b, each beam separation surface 8a of the prism 8 is formed to be inclined with respect to the light detection surfaces (a), (b), (c) and (d) of the photodetector elements 9 and 10 along the direction perpendicular to the direction along which the convergent beam is divided to two luminous fluxes 11 and 12, that is, along the direction of the prism ridge (C) of the prism 8.

In accordance with the structure mentioned above, the beam separating prism surface 8a of the prism 8 (accordingly the ridgeline of the prism) is inclined with respect to the light receiving surface of the elements 9 and 10, which makes it possible to adjust the gap between the two convergent points (P) and (Q) of the separated two luminous fluxes 11 and 12 by moving the prism 8 along the direction perpendicular to the drawing sheet of FIG. 4a so that the gap between the points (P) and (Q) becomes equal to the width between the divisional lines (A) and (B) of the elements 9 and 10, respectively. Thereby, it becomes possible to realize a compact structure of the focus error detection device which enables to easily adjust the position of the optical axis at the time of detecting the focus error signal.

It is to be noted that the prism 8 may be secured with respect to the detector elements 9 and 10 to form one integrated unit composed of the prism and the elements.

It is also to be noted that the prism 8 itself may be arranged to be inclined instead of inclining the prism surface 8a as mentioned above.

Figure 5A:
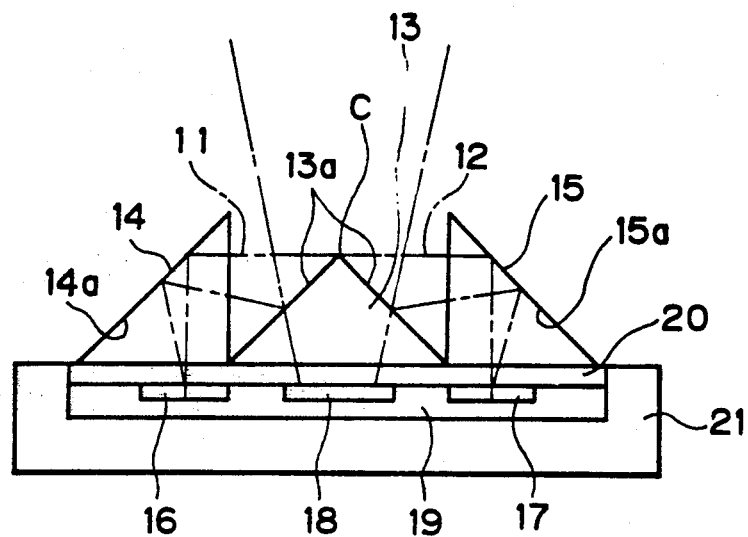
FIG. 5a is a constructional view of still another embodiment of the present invention wherein prisms and light receiving elements are combined together to form one integral body.
Figure 5B:
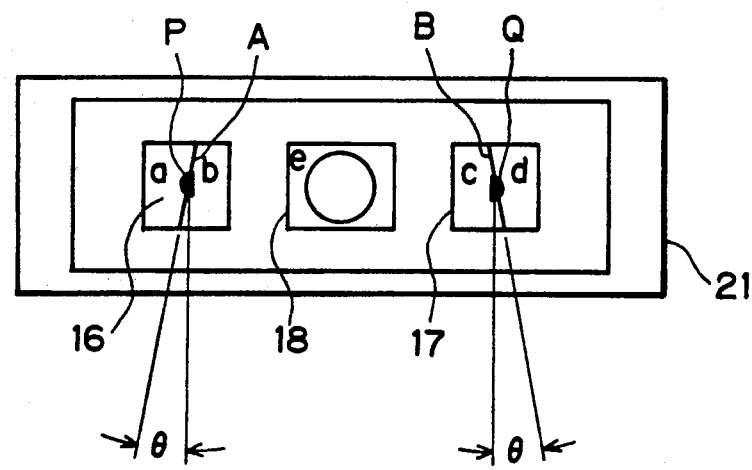

FIGS. 5a and 5b illustrates a third embodiment of the present invention. The same or corresponding parts are designated by the same reference numerals or letters as the first embodiment and the explanation thereof are deleted. In this embodiment, on the optical path of the reflection beam from the disk 5 after passing through the beam splitter 2, a first rectangular prism 13 is disposed which prism has beam separating reflection surfaces 13a which reflect and divide the incident reflection beam to two luminous fluxes 11 and 12, each having a semi-circle beam section. On the optical path of the beam 11 reflected by the reflection surface 13a of the prism 13 is disposed a second rectangular prism 14 which has an oblique side reflection surface 14a which reflects the beam 11. Also, on the optical path of the beam 12 reflected by the reflection surface 13a of the prism 13 is disposed a third rectangular prism 15 which has an oblique side reflection surface 15a.

The reflection surface 13a of the prism 13 is coated with a film to form a total reflection surface, a semi-transparent surface or a polarization surface on the prism, according to the purpose of the devise, if necessary.

Also, under the second prism 14 is disposed a two-divisional light receiving element 16 which has two light receiving surfaces (photodetecting surfaces) (a) and (b). Also, under the third prism 15 is disposed a two-divisional light receiving element 17 which has two light receiving surfaces (photodetector surfaces) (c) and (d). Further, under the first prism 13 is disposed a non-divisional light receiving element 18 which has a light receiving surface (photodetecting surface) (e). The light receiving detector elements 16, 17 and 18 are disposed on the same substrate 19 which is covered by a glass plate 20 from the upper side thereof. The lower side of the substrate 19 is covered by a package housing 21. In this embodiment, the divisional line (A) between the detector surfaces (a) and (b) of the element 16 and the divisional line (B) between the detector surfaces (c) and (d) of the element 17 are reversely inclined separating from each other by an angle θ with respect to the ridgeline (C) of the prism 13.

In accordance with the structure mentioned above, the prisms 13, 14 and 15 are assembled as one integral unit body which is installed in the optical device as illustrated in FIG. 3. According to this structure, only by adjusting the position of the prism assembly along the direction perpendicular to the drawing sheet of FIG. 5a, it becomes possible to coincide the length between the two convergent points P and Q with the length between the divisional lines A and B of the detector elements 16 and 17.

In general, the positional accuracy of about 0.01 mm is required when such a prism assembly is to be disposed. Therefore, to cancel the gap length error of 0.01 mm between the convergent points by the adjusting stroke within a range of ±0.1 mm of the prism assembly, it becomes necessary that the inclination angle θ of the divisional lines A and B are more than 5.7 degrees ($\theta > \arctan(0.01/0.1) = 5.7°$).

Therefore, as mentioned above, by the arrangement wherein the divisional lines A and B of the detector surfaces of the elements 16 and 17 are reversely inclined with respect to the line perpendicular to the line along which the beams 11 and 12 are separated (that is, with respect to the ridgeline C of the prism 13), it becomes possible to easily adjust the positional relation between the convergent points P and Q and the detector surfaces a, b, c and d, even for the structure wherein the two elements 16 and 17 are formed integrally as one unit on the same substrate. Thereby, it becomes possible to realize a compact structure of the focus error detection device which enables to easily adjust the optical axis of the detection system at the time of detecting the focus error signal by the Foucault method.

Figure 6A:
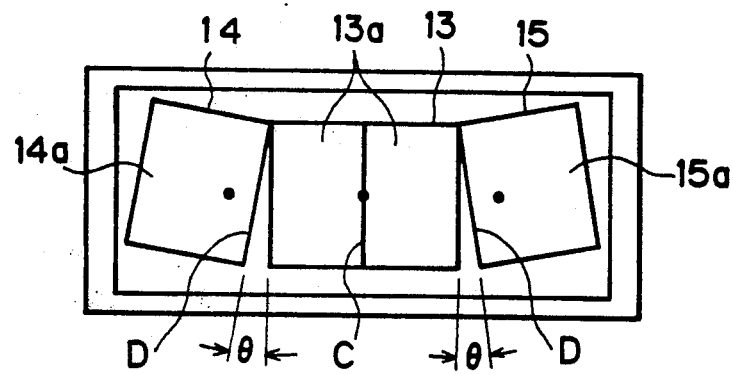
FIG. 6a is a plan view of the focus error signal detection device in accordance with a further embodiment of the present invention wherein the prisms and the light receiving elements are combined together to form one integral body.
Figure 6B:
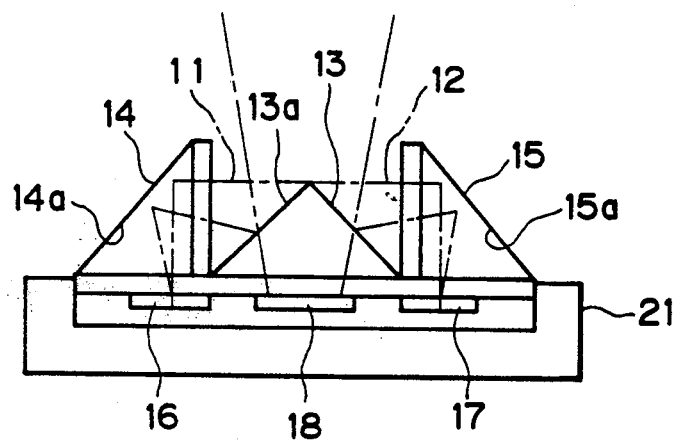
Figure 6C:
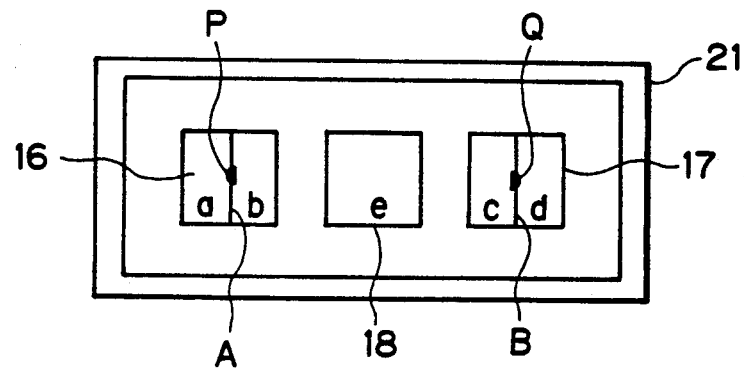

Next, a fourth embodiment of the present invention is described below with reference to FIGS. 6a to 6b.

The same or corresponding parts are designated by the same reference numerals or letters as the third embodiment (FIGS. 5a and 5b) mentioned above.

In this embodiment, the ridgelines D of the second prism 14 and the third prism 15 are reversely inclined with respect to the line perpendicular to the line along which the beams 11 and 12 are separated, that is, with respect to the ridgeline C of the first prism 13, symmetrically separating from each other from the ridgeline C. Therefore, in accordance with this embodiment also, for the same reason as mentioned referring to the third embodiment, it becomes possible to easily adjust the positional relation between the convergent points P and Q and the detection surfaces a, b, c and d, even if the two detector elements 16 and 17 are formed as one integral body disposed on the same substrate, which makes it possible to realize a compact structure of the focus error detection device which enables to easily adjust the optical axis of the optical system of the device at the time of detecting the focus error signal by the Foucault method.

Next, a fifth embodiment of the present invention is described with reference to FIGS. 7a to 7c and FIGS. 8a and 8b.

The same or corresponding parts are designated by the same reference numerals or letters as the fourth embodiment mentioned above and the explanation thereof are deleted.

In this embodiment, on the optical path of the luminous reflection flux reflected from the disk 5 and after passing through the beam splitter 2, there is disposed a beam divisional prism 22 having beam separation surfaces 22a which reflect and divide the reflection beam to two luminous fluxes 11 and 12 each of which has a semi-circle beam section. On the optical paths of the separated luminous fluxes 11 and 12, there are disposed two oblique side prisms 23 and 24, respectively, having reflection surfaces 23a and 24a which reflect the beam toward the directions perpendicular to each other. A pair of two-divided light receiving detector elements 25 and 26 is disposed on a common substrate 19 as one integrated unit. The element 25 has two light receiving areas (a) and (b) divided by the divisional line (A). The element 26 has two light receiving areas (c) and (d) divided by the divisional line (B). The divisional lines A and B are formed in the directions corresponding to the inclination angles of the reflection surfaces 23a and 24a of the prisms 23 and 24, respectively.

It is to be noted that under the prism 22 may be disposed a non-divisional light receiving element (photodetector element).

In accordance with the structure mentioned above, the luminous flux incident to the prism 22 is divided to two semi-circle luminous fluxes 11 and 12 which are reflected by the prisms 23 and 24, respectively, disposed in both sides of the prism 22. Thereby, the luminous fluxes 11 and 12 are rotated by 45 degrees in the opposite directions to each other so that the fluxes are converged on the detector surfaces a, b, c, and d of the two elements 25 and 26, respectively, disposed on the same plane. Therefore, even after the elements are assembled with the package 21 to form one integral unit, by adjusting the position of the assembled structure in the direction perpendicular to the drawing sheet of FIG. 7b, it becomes possible to locate the convergent points P and Q of the spots of the luminous fluxes 11 and 12 on the divisional lines A and B, respectively, to detect the focus error signal by the Foucault method.

It is to be noted that the focus error signal Fo can be obtained from the following equation.

$$Fo = (a+c) - (b+d)$$

Figure 7A:
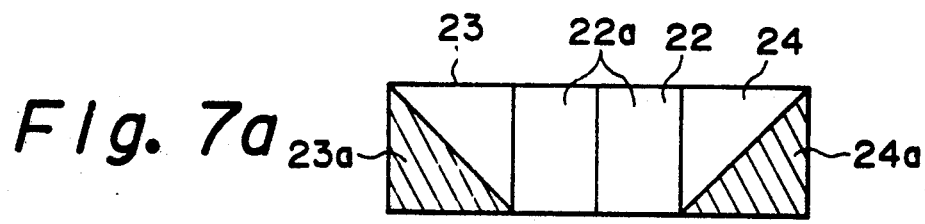
FIG. 7a is a plan view of an arrangement of three prisms in accordance with a still further embodiment of the present invention.
Figure 7B:
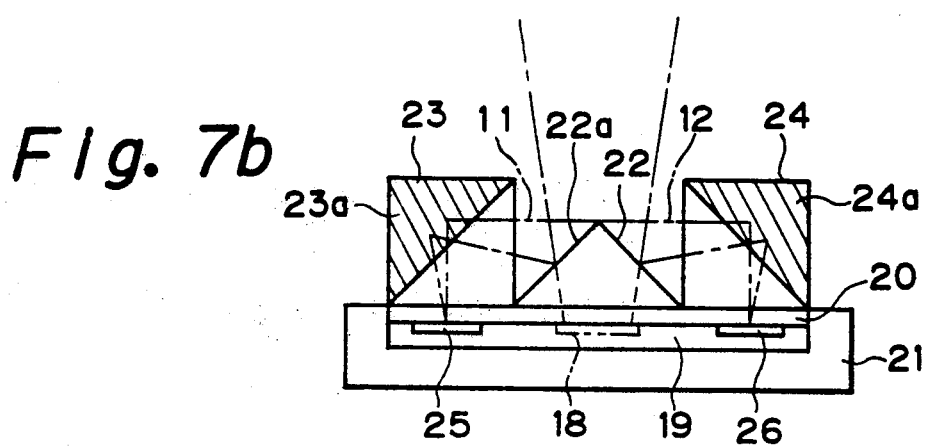
FIG. 7b is a side view of the focus error signal detection device to which the arrangement of FIG. 7a is applied.
Figure 7C:
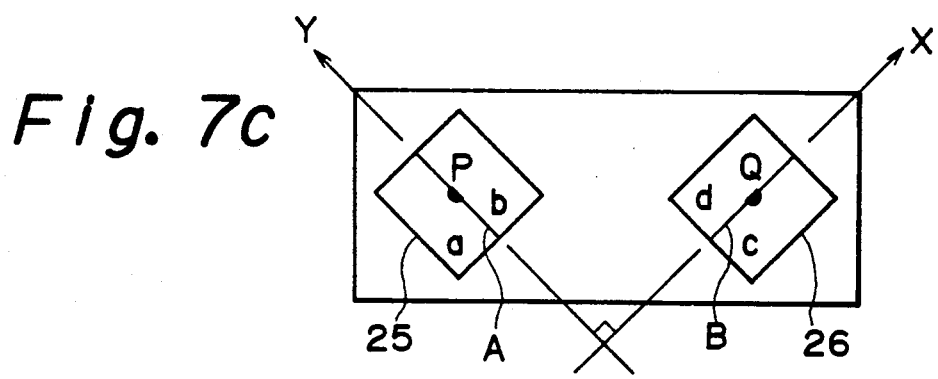
FIG. 7c is a plan view of the light receiving element integrated with a substrate used in the focus error signal detection device of FIG.7B.
Figure 8A:
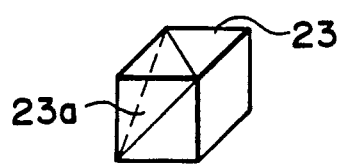
FIG. 8a is a perspective view of one of a pair of prisms used in the focus error detection device in accordance with a still further embodiment of the present invention.
Figure 8B:
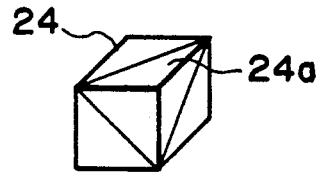

Also, since the divisional lines A and B are perpendicular to each other, as illustrated in FIG. 7c, by adjusting in the direction X or Y, it becomes possible to smoothly adjust the position along that direction without influencing the other light receiving surface.

As mentioned above, in accordance with the fifth embodiment of the present invention, the two luminous fluxes 11 and 12 divided with the use of two prisms 23 and 24 are perpendicular to the two divisional lines A and B of the elements 25 and 26, respectively. Therefore, it becomes possible to easily adjust relative position between the convergent points P and Q and the detector surfaces a, b, c, and d, for the respective elements 25 and 26 individually and solely, even if the two elements 25 and 26 are formed as one integral unit on the same substrate. Thereby, it becomes possible to realize a compact structure of the focus error signal detection device which enables to easily adjust the optical axis of the optical system of the device at the time of detecting the focus error signal by the Foucault method.

Figure 9A:
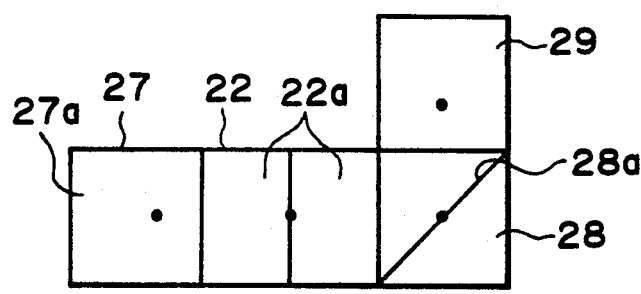
FIG. 9a is a plan view of an arrangement of four prisms used for the focus error detection device in accordance with a still further embodiment of the present invention.
Figure 9B:
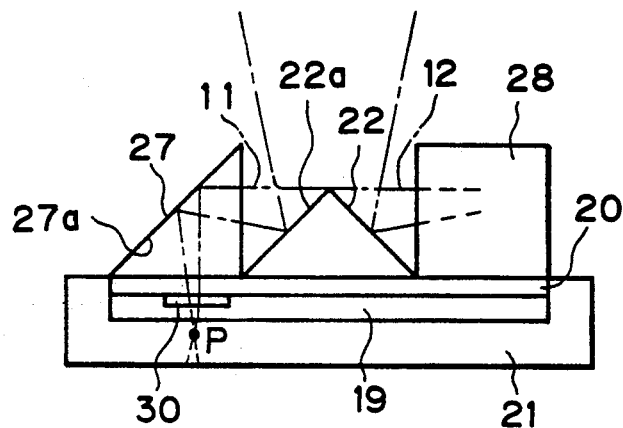
FIG. 9b is a side view of the focus error detection device to which the arrangement of FIG. 9a is applied.

Next, a sixth embodiment of the present invention is described below with reference to FIGS. 9a to 9c.

It is to be noted that the same or corresponding parts are designated by the same numerals or letters as the fourth embodiment mentioned above and the explanation thereof are deleted.

In this embodiment, on the optical path of the reflection beam reflected from the disk 5 and after passing through the beam splitter 2 is disposed a beam divisional prism 22 having beam separation prism surfaces 22a which reflect and divide the reflection beam to two luminous fluxes 11 and 12 each having a semi-circle beam section.

On the optical path of the luminous flux 11 divided by one of the reflection prism surfaces 22a is disposed a rectangular prism 27 having a reflection prism surface 27a which reflects the incident beam to the direction perpendicular to the incident beam direction. Also, on the optical path of the luminous flux 12 divided by the other of the reflection prism surfaces 22a are two rectangular prisms 28 and 29 having reflection prism surfaces 28a and 29a, respectively, which reflect the incident beam to the directions perpendicular to each other.

On the optical path of the reflection beam reflected by the prism surface 27a is disposed a two-divisional light receiving photodetector element 30 having a detection area which is divided to two detection areas (a) and (b). Also, on the optical path of the reflection beam reflected by the prism surface 29a is disposed a two-divisional light receiving photodetector element 31 having a detector area which is divided to two detection areas (c) and (d). The elements 30 and 31 are arranged on the same substrate 19 to form one integral structure.

In the above mentioned structure, the divisional line A between the area (a) and (b) of the element 30 and the divisional line B between the area (c) and (d) of the element 31 are formed along the directions corresponding to the inclination angles of the prism surfaces 27a and 29a of the prism 27 and 29, respectively. Also, the detection surfaces (a) and (b) of the element 30 are located before the convergent point P of the luminous flux 11 whereas the detection surfaces (c) and (d) of the element 31 are located after the convergent point Q of the luminous flux 12.

Figure 9C:
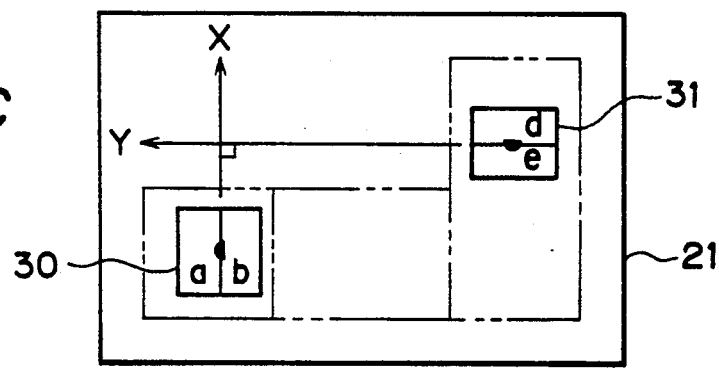
Figure 9D:
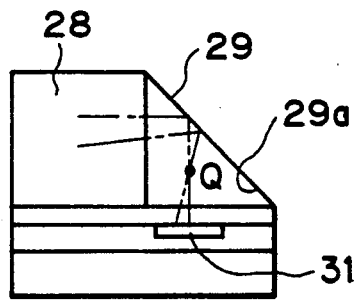
FIG. 9d is a side view of the focus error detection device of FIG. 9b seen from the right side of FIG. 9b.

In accordance with the structure mentioned above, the luminous fluxes 11 and 12 are rotated by 90 degrees with respect to each other, as illustrated in FIG. 9c, and converged toward the detector elements, respectively. The positions of the convergent points are adjusted by the same way as the fifth embodiment mentioned above. In this sixth embodiment is further featured in that the beam spots before and behind the convergent points P and Q formed on the light receiving surfaces of the elements 30 and 31 are detected on the basis of the difference between the optical path lengths to the detection surfaces of the detector elements, whereby it becomes possible to adjust the optical axis of the beam flux in a state wherein the diameter of the beam spot is relatively large, which makes the adjustment operation further easy.

It is to be noted that the focus error signal Fo can be obtained in this embodiment from the following equation.

$$Fo=(a+d)-(b+c)$$

As mentioned above, in accordance with the sixth embodiment of the present invention, the two luminous fluxes 11 and 12 divided with the use of the three prisms 27, 28 and 29 are arranged perpendicular to the divisional lines of the elements 30 and 31, whereby it becomes possible to easily adjust the positional relation between the convergent points P and Q and the detection areas a, b, c, and d, of the elements 30 and 31 solely and independently for each element, even if the elements are formed as one integral structure on the same plane of the common substrate. Thereby, it becomes possible to realize a compact focus error signal detection device which enables to easily adjust the optical path of the optical system of the device at the time of detecting the focus error signal with the use of the Foucault method.

In accordance with the first embodiment of the present invention, as mentioned above, there is proposed an optical information read/write device which records information data in an optical information recording medium by converging a luminous flux emitted from a semiconductor laser device by a condenser lens on a surface of the information recording medium as well as which read/write device also reads the information data from the recording medium by introducing the reflection light reflected from the recording medium surface into a beam splitter so that the reflection beam is separated from the laser beam emitted from the semiconductor laser device so that the information data is read and the focus error signal is detected from the reflection beam, wherein a beam divisional prism having a roof type beam separation surface is arranged so that a reflection light reflected from the optical information recording medium is divided to two semi-circle luminous fluxes arranged on an optical path of the reflection light after passing through the beam splitter and wherein two (a pair of) two-divided light receiving elements (photodetector elements) are arranged combined together to form one unit arranging the light receiving surfaces of the two elements on a same plane each of which surfaces receives the semicircle luminous flux divided by the beam divisional prism and detects the focus error signal from the position change of the convergent point of the luminous flux and wherein the divisional line of the light receiving surface of each light receiving element is inclined with respect to the direction perpendicular to the direction along which the beams are separated by the prism so that the two light receiving elements are disposed in such a way that the two divisional lines become substantially or approximately symmetric with each other with respect to a line perpendicular to the direction along which the beams are separated by the prism.

Therefore, it is an advantage of the present invention realized by the first embodiment of the present invention, as mentioned above, so that it becomes possible to easily adjust the positional relation between the light receiving surface of the photodetector element and the convergent point of the optical flux to be detected even in the structure wherein the two pairs of the two-divided light receiving elements (photodetector elements) are combined together on the same substrate to form one unit, which makes it possible to realize a compact structure of the focus error detection device which enables to easily adjust the optical axis at the time of detecting the focus error with the use of Foucault method, due to the arrangement wherein the divisional line of the light receiving surface of each light receiving element is inclined with respect to the direction perpendicular to the direction along which the beams are separated by the prism so that the two light receiving elements are disposed in such a way that the two divisional lines become substantially or approximately symmetric with each other with respect to a line perpendicular to the direction along which the beams are separated by the prism, that is, the divisional lines are reversely inclined toward opposite directions separating away from the direction of the ridgeline of the beam divisional prism.

In accordance with the second embodiment of the present invention, as mentioned above, there is proposed an optical information read/write device which records information data in an optical information recording medium by converging a luminous flux emitted from a semiconductor laser device by a condenser lens on a surface of the information recording medium as well as which read/write device also reads the information data from the recording medium by introducing the reflection light reflected from the recording medium surface into a beam splitter so that the reflection beam is separated from the laser beam emitted from the semiconductor laser device so that the information data is read and the focus error signal is detected from the reflection beam, wherein a beam divisional prism having a roof type beam separation surface is arranged so that a reflection light reflected from the optical information recording medium is divided to two semi-circle luminous fluxes arranged on an optical path of the reflection light after passing through the beam splitter and wherein two (a pair of) two-divided light receiving elements (photodetector elements) are arranged combined together to form one unit arranging the light receiving surfaces of the two elements on a same plane each of which surfaces receives the semicircle luminous flux divided by the beam divisional prism and detects the focus error signal from the position change of the convergent point of the luminous flux and wherein the beam separation surface of the beam divisional prism is inclined with respect to the light receiving surface of the two-divided light receiving element in the direction perpendicular to the direction along which the beams are separated by the prism.

Therefore, the above mentioned advantage of the present invention is also realized by the second embodiment of the present invention so that it becomes possible to easily adjust the positional relation between the light receiving surface of the photodetector element and the convergent point of the optical flux to be detected even in the structure wherein the two pairs of the two-divided light receiving elements (photodetector elements) are combined together on the same substrate to form one unit, which makes it possible to realize a compact structure of the focus error detection device which enables to easily adjust the optical axis at the time of detecting the focus error with the use of Foucault method, due to the arrangement wherein the beam separation surface of the beam divisional prism is inclined with respect to the light receiving surface of the two-divided light receiving element in the direction perpendicular to the direction along which the beams are separated by the prism, that is, the direction of the ridgeline of the beam divisional prism.

In accordance with the third embodiment of the present invention, as mentioned above, there is proposed an optical information read/write device which records information data in an optical information recording medium by converging a luminous flux emitted from a semiconductor laser device by a condenser lens on a surface of the information recording medium as well as which read/write device also reads the information data from the recording medium by introducing the reflection light reflected from the recording medium surface into a beam splitter so that the reflection beam is separated from the laser beam emitted from the semiconductor laser device so that the information data is read and the focus error signal is detected from the reflection beam, wherein a beam divisional first rectangular prism having a beam separation reflecting surface is arranged so that a reflection light reflected from the optical information recording medium is reflected and divided to two semi-circle luminous fluxes arranged on an optical path of the reflection light after passing through the beam splitter, wherein a second prism and a third prism are arranged, each prism having an inclined surface for reflecting the semicircle luminous flux reflected and separated by the beam separation reflecting surface of the first rectangular prism, wherein two (a pair of) two-divided light receiving elements (photodetector elements) are arranged combined together to form one unit arranging the light receiving surfaces of the two elements on a same plane each of which surfaces receives the semicircle luminous flux reflected by the inclined surfaces of the second and third prisms and detects the focus error signal from the position change of the convergent point of the luminous flux and wherein the divisional line of the light receiving surface of each light receiving element is inclined with respect to the direction perpendicular to the direction along which the beams are separated by the prism so that the two light receiving elements are disposed in such a way that the two divisional lines become substantially or approximately symmetric with each other with respect to a line perpendicular to the direction along which the beams are separated by the prism.

Therefore, the above mentioned advantage of the present invention can be also realized by the third embodiment of the present invention so that it becomes possible to easily adjust the positional relation between the light receiving surface of the photodetector element and the convergent point of the optical flux to be detected even in the structure wherein the two pairs of the two-divided light receiving elements (photodetector elements) are combined together on the same substrate to form one unit, which makes it possible to realize a compact structure of the focus error detection device which enables to easily adjust the optical axis at the time of detecting the focus error with the use of Foucault method, due to the arrangement wherein the divisional line of the light receiving surface of each light receiving element is inclined with respect to the direction perpendicular to the direction along which the beams are separated by the prism so that the two light receiving elements are disposed in such a way that the two divisional lines become substantially or approximately symmetric with each other with respect to a line perpendicular to the direction along which the beams are separated by the prism, that is, the divisional lines are reversely inclined toward opposite directions separating away from the direction of the ridgeline of the first rectangular prism.

In accordance with the fourth embodiment of the present invention, as mentioned above, there is proposed an optical information read/write device which records information data in an optical information recording medium by converging a luminous flux emitted from a semiconductor laser device by a condenser lens on a surface of the information recording medium as well as which read/write device also reads the information data from the recording medium by introducing the reflection light reflected from the recording medium surface into a beam splitter so that the reflection beam is separated from the laser beam emitted from the semiconductor laser device so that the information data is read and the focus error signal is detected from the reflection beam, wherein a beam divisional first rectangular prism having a beam separation reflecting surface is arranged so that a reflection light reflected from the optical information recording medium is reflected and divided to two semi-circle luminous fluxes arranged on an optical path of the reflection light after passing through the beam splitter, wherein a second prism and a third prism are arranged, each prism having an inclined surface for reflecting the semicircle luminous flux reflected and separated by the beam separation reflecting surface of the first rectangular prism, wherein two (a pair of) two-divided light receiving elements (photodetector elements) are arranged combined together to form one unit arranging the light receiving surfaces of the two elements on a same plane each of which surfaces receives the semicircle luminous flux reflected by the inclined surfaces of the second and third prisms and detects the focus error signal from the position change of the convergent point of the luminous flux and wherein the second and third prisms are disposed in such a way that the two ridgelines of the prisms become substantially or approximately symmetric with each other with respect to a line perpendicular to the direction along which the beams are separated by the first prism.

Therefore, the above mentioned advantage of the present invention can be also realized by the fourth embodiment of the present invention so that it becomes possible to easily adjust the positional relation between the light receiving surface of the photodetector element and the convergent point of the optical flux to be detected even in the structure wherein the two pairs of the two-divided light receiving elements (photodetector elements) are combined together on the same substrate to form one unit, which makes it possible to realize a compact structure of the focus error detection device which enables to easily adjust the optical axis at the time of detecting the focus error with the use of Foucault method, due to the arrangement wherein the second and third prisms are disposed in such a way that the two ridgelines of the prisms become substantially or approximately symmetric with each other with respect to a line perpendicular to the direction along which the beams are separated by the first prism, that is, the ridgelines are reversely inclined toward opposite directions separating away from the direction of the ridgeline of the first rectangular prism.

In accordance with the fifth embodiment of the present invention, there is proposed an optical information read/write device which records information data in an optical information recording medium by converging a luminous flux emitted from a semiconductor laser device by a condenser lens on a surface of the information recording medium as well as which read/write device also reads the information data from the recording medium by introducing the reflection light reflected from the recording medium surface into a beam splitter so that the reflection beam is separated from the laser beam emitted from the semiconductor laser device so that the information data is read and the focus error signal is detected from the reflection beam, wherein a beam divisional prism having a beam separation reflecting surface is arranged so that a reflection light reflected from the optical information recording medium is divided to two semi-circle luminous fluxes arranged on an optical path of the reflection light after passing through the beam splitter, wherein two oblique side prisms having a reflection surface for reflecting the luminous flux reflected and separated by the beam separation reflecting surface of the beam divisional prism are disposed in such a way that the reflection surfaces are arranged so that the reflection beams reflected by the surfaces become perpendicular to each other and wherein two (a pair of) two-divided light receiving elements (photodetector elements) are arranged combined together to form one unit arranging the light receiving surfaces of the two elements on a same plane each of which surfaces receives the semicircle luminous flux reflected by the reflection surface of the prism and detects the focus error signal from the position change of the convergent point of the luminous flux and wherein the divisional line of the light receiving surface of each light receiving element is arranged to correspond to the inclination angle of the reflection surface of the oblique side prism.

Therefore, the above mentioned advantage of the present invention can be also realized by the fifth embodiment of the present invention so that it becomes possible with respect to the individual photodetector element to independently and easily adjust the positional relation between the light receiving surface of the photodetector element and the convergent point of the optical flux to be detected even in the structure wherein the two pairs of the two-divided light receiving elements (photodetector elements) are combined together on the same substrate to form one unit, which makes it possible to realize a compact structure of the focus error detection device which enables to easily adjust the optical axis at the time of detecting the focus error with the use of Foucault method, due to the arrangement wherein two oblique side prisms having a reflection surface for reflecting the luminous flux reflected and separated by the beam separation reflecting surface of the beam divisional prism are disposed in such a way that the reflection surfaces are arranged so that the reflection beams reflected by the surfaces become perpendicular to each other and wherein two (a pair of) two-divided light receiving elements (photodetector elements) are arranged combined together to form one unit arranging the light receiving surfaces of the two elements on a same plane each of which surfaces receives the semicircle luminous flux reflected by the reflection surface of the prism and detects the focus error signal from the position change of the convergent point of the luminous flux and wherein the divisional line of the light receiving surface of each light receiving element is arranged to correspond to the inclination angle of the reflection surface of the oblique side prism, that is, two beams separated with the use of two oblique prisms are arranged perpendicular to the two divisional lines of the two-divided photodetector elements, respectively.

In accordance with the sixth embodiment of the present invention, as mentioned above, there is proposed an optical information read/write device which records information data in an optical information recording medium by converging a luminous flux emitted from a semiconductor laser device by a condenser lens on a surface of the information recording medium as well as which read/write device also reads the information data from the recording medium by introducing the reflection light reflected from the recording medium surface into a beam splitter so that the reflection beam is separated from the laser beam emitted from the semiconductor laser device so that the information data is read and the focus error signal is detected from the reflection beam, wherein a beam divisional prism having a beam separation reflecting surface is arranged so that a reflection light reflected from the optical information recording medium is divided to two semi-circle luminous fluxes arranged on an optical path of the reflection light after passing through the beam splitter, wherein three rectangular prisms having a reflection surface for reflecting the luminous flux reflected and separated by the beam separation reflecting surface of the beam divisional prism are disposed in such a way that the reflection surfaces are arranged so that the reflection beams reflected by the surfaces become perpendicular to each other and wherein two (a pair of) two-divided light receiving elements (photodetector elements) are arranged combined together to form one unit arranging the light receiving surfaces of the two elements on a same plane each of which surfaces receives the semicircle luminous flux reflected by the reflection surface of the prism and detects the focus error signal from the position change of the convergent point of the luminous flux and wherein the divisional line of the light receiving surface of each light receiving element is arranged to correspond to the inclination angle of the reflection surface of the rectangular prism and wherein the light receiving surfaces of the two-divided light receiving elements are disposed before and behind the convergent point of the luminous flux, respectively.

Therefore, the above mentioned advantage of the present invention can be also realized by the sixth embodiment of the present invention so that it becomes possible with respect to the individual photodetector element to independently and easily adjust the positional relation between the light receiving surface of the photodetector element and the convergent point of the optical flux to be detected even in the structure wherein the two pairs of the two-divided light receiving elements (photodetector elements) are combined together on the same substrate to form one unit, which makes it possible to realize a compact structure of the focus error detection device which enables to easily adjust the optical axis at the time of detecting the focus error with the use of Foucault method, due to the arrangement wherein a beam divisional prism having a beam separation reflecting surface is arranged so that a reflection light reflected from the optical information recording medium is divided to two semi-circle luminous fluxes arranged on an optical path of the reflection light after passing through the beam splitter, wherein three rectangular prisms having a reflection surface for reflecting the luminous flux reflected and separated by the beam separation reflecting surface of the beam divisional prism are disposed in such a way that the reflection surfaces are arranged so that the reflection beams reflected by the surfaces become perpendicular to each other and wherein two (a pair of) two-divided light receiving elements (photodetector elements) are arranged combined together to form one unit arranging the light receiving surfaces of the two elements on a same plane each of which surfaces receives the semicircle luminous flux reflected by the reflection surface of the prism and detects the focus error signal from the position change of the convergent point of the luminous flux and wherein the divisional line of the light receiving surface of each light receiving element is arranged to correspond to the inclination angle of the reflection surface of the rectangular prism and wherein the light receiving surfaces of the two-divided light receiving elements are disposed before and behind the convergent point of the luminous flux, respectively, that is, two beams separated with the use of three rectangular prisms are arranged perpendicular to the two divisional lines of the two-divided photodetector elements, respectively.

A further embodiment of the present invention is described below.

Figure 10A:
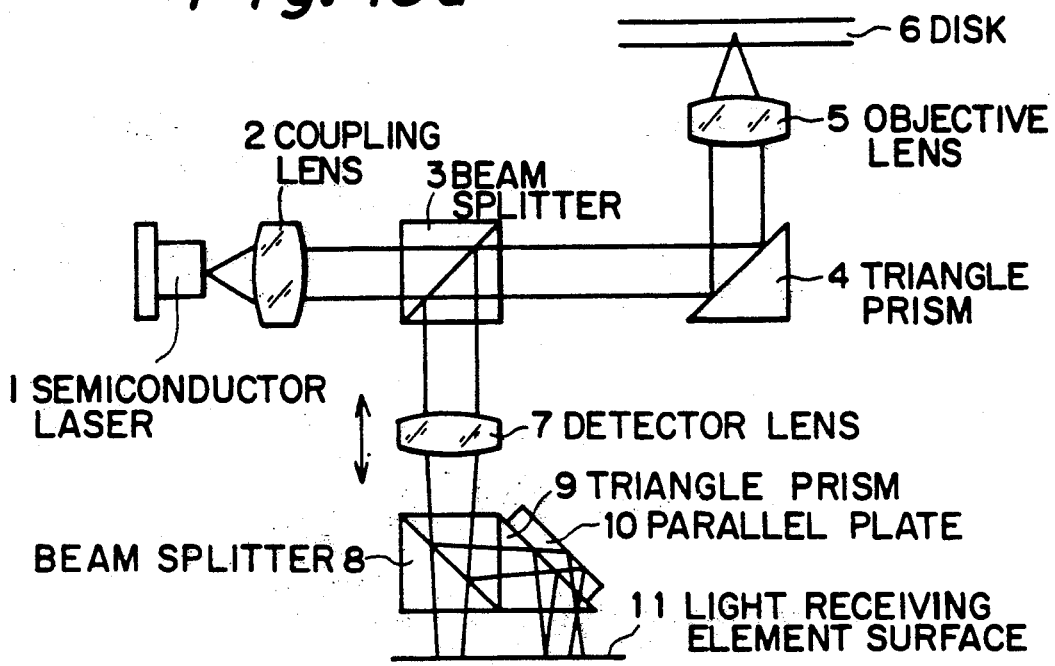
FIG. 10a is a constructional view of the focus error detection device in accordance with a still further embodiment of the present invention.
Figure 10B:
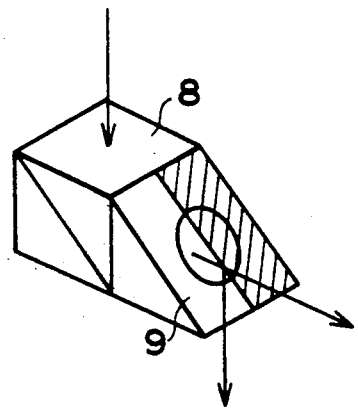
Figure 10C:
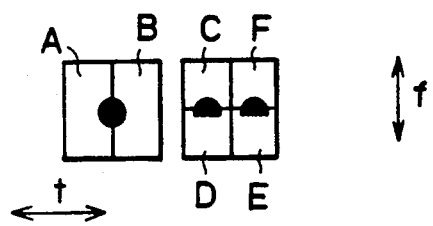

An embodiment of the focus detection device in accordance with the present invention is illustrated in FIGS. 10a to 10c. In the drawings, a semiconductor laser (LD) 1, a coupling lens 2, a beam splitter 3, a triangle prism 4, an objective lens 5, a disk 6, a detector lens 7, a beam splitter 8, a triangle prism 9, a parallel plate 10 having parallel plane surfaces, and a surface 11 of a light receiving element are depicted.

The luminous flux emitted from the laser diode 1 is collimated by the coupling lens 2 and passes through the beam splitter 3. The laser beam is then reflected by the prism 4 to the lens 5 which converges the beam on the disk surface 6. The reflection beam reflected from the disk surface 6 is reflected by the beam splitter 3 to the photodetecting unit portion. The photodetection unit comprises a beam splitter (or a polarization beam splitter) 8, a triangle prism 9 which is coated with a reflection film on the half of the oblique side surface thereof as illustrated in FIG. 10b, a transparent parallel plate 10 and light receiving elements A to F the detecting surfaces of which are disposed on a same plane, as illustrated in FIG. 10c.

The reflection beam reflected from the disk surface 6 is converged by the lens 7 and divided by the beam splitter 8 to two beams, that is, a penetration beam and a reflection beam. The penetration beam is detected by the photodetectors A and B which generate a track signal represented as $Tr = A - B$.

On the other hand, the reflection beam reflected by the beam splitter 8 propagates to the prism surface of the prism 9 where a semi-circle half of the beam is reflected downward by the reflection coat formed thereon and the other semi-circle half of the beam penetrates through the prism, as illustrated in FIG. 10b. The semi-circle reflection beam is input to the photodetectors C and D. Also, the semi-circle penetration beam is reflected by the outer surface of the plate 10 downward to the photodetectors E and F. The convergent points of the two semi-circle beams are positioned before and behind the photodetector surface, respectively, at a same distance therefrom. Therefore, the sizes of the beam spots of the two semi-circle beam formed on the detector surface are the same together. Such a positional adjustment of the convergent points of the beams can be conducted by moving the lens 7 as illustrated by the arrow in FIG. 10a, for instance.

After that, the objective lens actuator is operated so that the state of the spots formed on the disk surface becomes being on-focus and on-track. In this state, the photodetectors are moved in the directions of arrows (f) and (t) to adjust the position thereof so that the focus signal and the track signal become zero. The focus signal is obtained from the equation Fo=(C+E)-(D+F). The information signal is obtained from the total sum of A to E. Also, if the numeral 8 represents a polarization beam splitter in the device using a photo-magnetic disk, the information signal Mo becomes that Mo=(A+B)−(C+D+E+F).

Figure 11A:
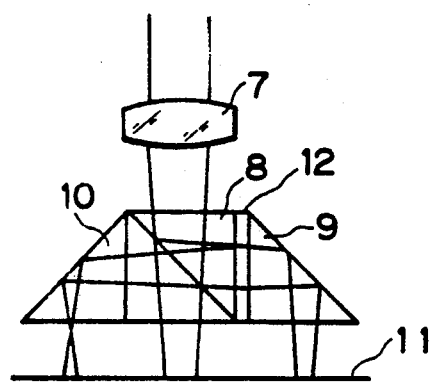
FIG. 11a is a constructional view of the focus error detection device in accordance with a still further embodiment of the present invention.
Figure 11B:
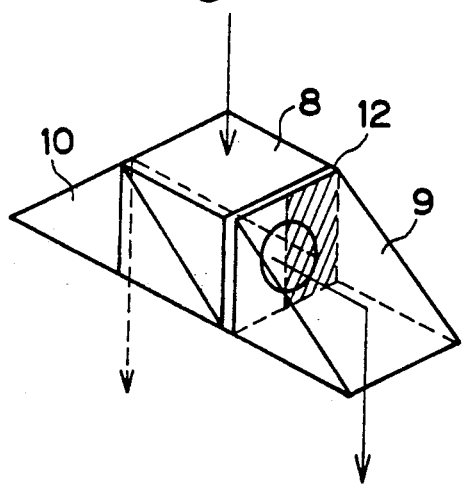
Figure 11C:
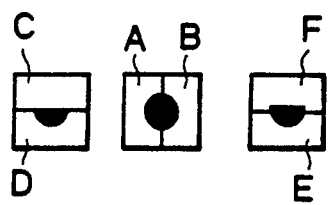

A still further embodiment of the focus detection device in accordance with the present invention is illustrated in FIGS. 11a to 11c. The same or corresponding parts are designated by the same numerals or letters as the embodiment of FIGS. 10a to 10c.

In the drawings, numeral 12 designates a quarter-wave plate. The reflection beam reflected by the polarization beam splitter 8 passes through the plate 12 to the prism 9. A half of the vertical surface of the prism 9 is coated with a reflection film as illustrated in FIG. 11b so that the beam incident to the prism is divided to two semi-circle beams, that is, a semi-circle penetration beam and a semi-circle reflection beam. The reflection beam passes back through the quarter-wave plate 12 again so that the polarization of the beam is changed by 90 degrees from that of the beam incident to the prism. Therefore, almost all of the luminous amount of the reflection beam passes through the polarization beam splitter 8 and enters into the photodetectors C and D. The signal adjustment operation is the same as that of the embodiment mentioned above.

As can be seen from the explanation mentioned above referring to FIGS. 10 and 11, in accordance with the embodiments of the present invention, the following advantages can be obtained.

That is, in the optical pick-up device utilizing the Foucault method as the method for detecting the focus signal, the focus detection device is arranged in such a way that the spot divisional direction (arrow f in FIG. 10c) to which the beam is divided by the reflection film and the spot separation direction (arrow t in FIG. 10c) are perpendicular to each other and that the photodetector surface is positioned between the convergent points of the two divided beams by the function of the parallel plate and the prisms so that the two semi-circle beam sections of the two spots formed on the detectors are the same size together and the linear cutting lines of the semi-circles are aligned with each other, instead of the arrangement of the ordinary Foucault method of the prior art wherein the convergent point is positioned on the detector surface to form a spot thereon. Therefore, it becomes possible to realize a compact structure of the focus detection device which can be easily assembled and adjusted with the use of photodetectors arranged on a same substrate.

Many widely different embodiments of the present invention may be constructed without departing from the spirit and scope of the present invention. It should be understood that the present invention is not limited to the specific embodiments described in the specification, except as defined in the appended claims.

What is claimed is:

1. A focus error signal detection device comprising:
   an optical system for guiding a reflection beam reflected from an optical information recording medium to a photo-detection system side;
   a beam dividing means for dividing said reflection beam into two beams;
   two photo-detecting means for detecting said two divided beams, respectively, having light receiving surfaces arranged on a same plane; and
   a beam position adjusting means for adjusting optical axes of said two divided beams with respect to a predetermined position of said photo-detecting means by simultaneously moving said two detecting means with respect to said beam dividing means;
   each of said photo-detecting means comprising a photodetector having a light receiving detection surface which is divided to two detecting areas by a linear divisional line, the two photodetectors being secured to each other and wherein the two divisional lines of said photodetectors are arranged in such a manner that the distance between the two divisional lines changes linearly;
   said beam dividing means comprising a prism having beam separating surfaces on both sides of a ridge-line thereof and two reflection means arranged so as to sandwich said prism therebetween for reflecting said divided beam to a side of said photodetector.

2. A focus error signal detection device comprising:
   an optical system for guiding a reflection beam reflected from an optical information recording medium to a photo-detection system side;
   a beam dividing means for dividing said reflection beam into two beams;
   two photo-detecting means for detecting said two divided beams, respectively, having light receiving surfaces arranged on a same plane; and
   a beam position adjusting means for adjusting optical axes of said two divided beams with respect to a predetermined position of said photo-detecting means by simultaneously moving said two detecting means with respect to said beam dividing means;
   said beam dividing means comprising a first prism having beam separating surfaces on both sides of a ridgeline thereof and second and third rectangular prisms with respective ridge lines, disposed so as to sandwich said first prism therebetween, for reflecting said divided beams to said photodetecting means, ridgelines of said second and third rectangular prisms being inclined with respect to said ridgeline of said first prism in such a manner that the distance between the two divided beams changes linearly.

3. A focus error signal detection device comprising:
   an optical system for guiding a reflection beam reflected from an optical information recording medium to a photo-detection system side;
   a beam dividing means for dividing said reflection beam into two beams;
   two photo-detecting means for detecting said two divided beams, respectively, having light receiving surfaces arranged on a same plane; and
   a beam position adjusting means for adjusting optical axes of said two divided beams with respect to a predetermined position of said photo-detecting means by simultaneously moving said two detecting means with respect to said beam dividing means;

said beam dividing means comprising a prism having beam separation surfaces on both sides of a ridgeline thereof and two reflection means disposed so as to sandwich said prism therebetween for reflecting the divided beams to said photodetecting means, each of said reflection means having a reflection surface to reflect the beams to a direction perpendicular to the reflecting direction of the other reflection means.

4. A focus error signal detection device comprising:
an optical system for guiding a beam from an optical information recording medium to a photo-detection system side;
a prism means being adapted to separate said beam into two beams with respect to a predetermined direction in such a manner that a distance between said separated beams changes linearly;
two photo-detecting means having light receiving surfaces arranged on a same plane for detecting respectively said separated two beams; and
a beam position adjusting means for adjusting optical axes of said separated two beams to respective predetermined positions of said photo-detecting means by simultaneously moving said two photo-detecting means with respect to said prism means;
said prism means comprising a separating prism having respective beam separating surfaces on both sides of a ridgeline thereof for separating said beam into two beams with respect to a direction perpendicular to said ridgeline, and two reflection means arranged so as to sandwich said separating prism therebetween for reflecting, respectively, said separated beams toward said photo-detecting means, reflection surfaces of said reflection means being inclined with respect to each other.

5. A focus error signal detection device according to claim 4, wherein said reflection means comprises respective rectangular reflecting prisms, ridgelines of said reflecting prisms being inclined with respect to each other.

6. A focus error signal detection device according to claim 5, wherein said two photo-detecting means comprise two respective photodetectors each having a light receiving detection surface divided into two detecting areas by a linear divisional line, said divisional lines being parallel to each other.

7. A focus error signal detection device according to claim 5, wherein said ridgelines of said reflecting prisms are perpendicular to each other.

8. A focus error signal detection device according to claim 7, wherein said two photo-detecting means comprise two respective photodetectors each having a light receiving detection surface divided into two detecting areas by a linear divisional line, said divisional lines being perpendicular to each other.

9. A focus error signal detection device according to claim 8, wherein said separating prism and said reflecting means are arranged in such a manner that one of said beams separated by said separating prism is converged before said light receiving surface of one of said photo-detecting means while the other of said separated beams is converged behind said light receiving surface of the other of said photo-detecting means.

* * * * *